May 13, 1930.     F. L. JOHNSON     1,758,520
TURNING LATHE
Filed Dec. 17, 1927
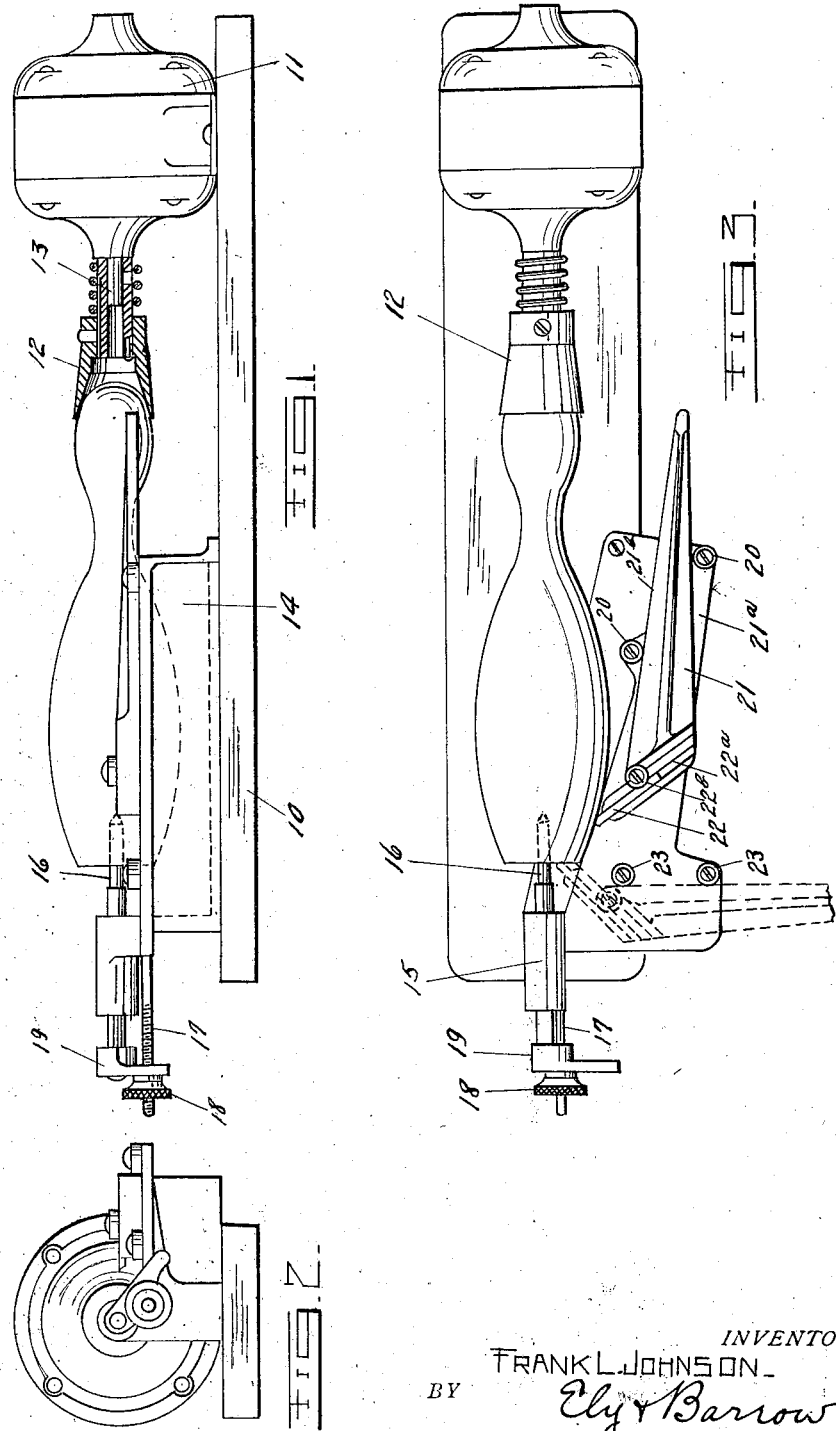
INVENTOR
FRANK L. JOHNSON
BY
Ely & Barrow
ATTORNEYS.

Patented May 13, 1930

1,758,520

UNITED STATES PATENT OFFICE

FRANK L. JOHNSON, OF AKRON, OHIO

TURNING LATHE

Application filed December 17, 1927. Serial No. 240,751.

This invention relates to turning lathes and particularly to lathes for redressing tenpins or the like.

The general purpose of the invention is to provide a simple, inexpensive lathe for use in redressing tenpins or for similar purposes and which may be easily operated even by unskilled workers to effectively turn a curved surface on a pin or the like.

A further object is to provide in a machine such as described above, a tool rest and a tool for cooperation therewith constructed so that movement of the tool over the rest will generate a curvilinear movement of the operative end of the tool to produce or dress a desired curved surface on the work.

A further object is to provide in such a machine as set forth in the preceding paragraph with means on the tool rest for guiding the tool in an end cutting or dressing operation.

The foregoing and other objects are obtained by the device illustrated in the accompanying drawings and described below. It is to be understood that the invention is not limited to the particular form thereof shown and described.

Of the accompanying drawings:

Figure 1 is a side elevation of equipment embodying the invention;

Figure 2 is a left end elevation thereof; and

Figure 3 is a plan thereof.

Referring to the drawings, the numeral 10 designates a bed plate on which is mounted a motor 11 having a chuck 12 mounted directly on the shaft thereof for longitudinal, yielding movement against the action of a spring 13, the chuck being keyed or splined to the shaft in any suitable way to rotate therewith.

On bed plate 10 a tool rest 14 is provided, the tool rest casting preferably having an integral bearing member 15 for a center 16 said center being longitudinally shiftable through the bearing member and means being provided such as the screw 17 and thumb nut 18 cooperating with an arm 19 secured to the center to shift the center.

On the tool rest 14 there are arranged studs 20, 20 between and against which a tool 21 is operable to guide the tool along a curvilinear path corresponding to the curved surface, in the example illustrated, of the portion of the tenpin to be redressed. The edges $21^a$, $21^b$ of the tool are straight and arranged at such an angle to each other and the studs 20 are so positioned that the cutting element 22 of the tool is caused to follow the desired curvilinear path by shifting the tool longitudinally of the work as usual in turning operations and at the same time maintaining its edges in contact with studs 20 which imparts the desired transverse component to produce the resultant curve. The cutting element 22 is secured to the tool in a groove $22^a$ therein by any suitable means such as indicated generally at $22^b$.

The tool rest 14 is also provided with transversely aligned studs 23, 23 for guiding tool 21 in an end dressing operation as indicated in dotted lines in Figure 2. The relative placement of studs 20 and studs 23 when embodying the invention in a tenpin redresser, is such that the curved surface turned upon the profile of the pin from about the point where the tool is shown in the full line position of Figure 3 to the bottom of the pin, and the surface formed by taking a dressing cut on the bottom of the pin as shown in dotted lines in Figure 3 will define a base for the pin of standard dimension.

In use the pin is mounted in the chuck and on the center as shown and the nut 18 is operated to adjust the work to a position where the redressing cuts may be made thereon as will be understood to reproduce a base of standard dimension on the pin. The pin is then ready for putting back into service.

Modifications of the invention may be resorted to without departing from the spirit thereof or the scope of the appended claims.

What is claimed is:

1. A lathe for redressing tenpins including work supporting and rotating means, means for adjusting the work longitudinally, a tool rest, a tool on the rest, and pairs of studs on the rest for guiding the tool, one pair of studs being so positioned as to receive the tool therebetween and to cooperate with the opposite edges thereof, said edges being at an angle to each other whereby the tool when shifted longitudinally and kept in contact with said studs will be guided along a curvilinear path by said studs to cut a curved surface on the profile of a pin, the other pair of studs being transversely aligned and so positioned with respect to said first pair as to take a dressing cut from the bottom of the pin having such relation to the profile redressing cut as to produce a base for the pin of predetermined dimension.

2. A lathe for redressing tenpins including work supporting and rotating means, means for adjusting the work longitudinally, a tool rest, a tool on the rest, and a pair of studs on the rest for guiding the tool, said studs being so positioned as to receive the tool therebetween and to cooperate with the opposite edges thereof, said edges being at an angle to each other whereby the tool when shifted longitudinally and kept in contact with said studs will be guided along a curvilinear path by said studs to cut a curved surface on the profile of a pin, and means for guiding the tool transversely and so positioned with respect to said studs as to take a dressing cut from the bottom of the pin having such relation to the profile redressing cut as to produce a base for the pin of predetermined dimension.

3. A lathe for redressing tenpins including work supporting and rotating means, means for adjusting the work longitudinally, a tool rest, a tool on the rest, and a pair of studs on the rest for guiding the tool, said studs being so positioned as to receive the tool therebetween and to cooperate with the opposite edges thereof, said edges being at an angle to each other whereby the tool when shifted longitudinally and kept in contact with said studs will be guided along a curvilinear path by said studs to cut a curved surface on the profile of a pin.

4. In a turning lathe, work supporting and rotating means, a tool rest, and a tool for operation on said rest, said rest having a pair of spaced off-set studs thereon adapted to receive the tool therebetween said tool having opposite edges for cooperating with said studs so directed with relation to each other as to generate a curvilinear movement to the cutting element of the tool when the tool is longitudinally shifted on the rest while maintaining the opposite edges thereof in contact with the studs.

5. A tenpin dressing machine comprising the combination in a lathe of fixed tool guiding means so positioned as to guide a tool for dressing cuts along the curved side and across the base of a pin to provide the pin with a base of desired dimensions, the driven shaft of the lathe having a chuck nonrotatably but longitudinally yieldingly mounted thereon, a center, and means for shifting said center toward and from the chuck, whereby tenpins may be longitudinally adjusted in the lathe into proper relation to said fixed tool guiding means for said dressing cuts.

FRANK L. JOHNSON.